Jan. 5, 1965     D. L. BRADSHAW     3,164,131
DEVICE FOR FAVORABLY POSITIONING AN ANIMAL FOR CASTRATION
Filed Sept. 23, 1963
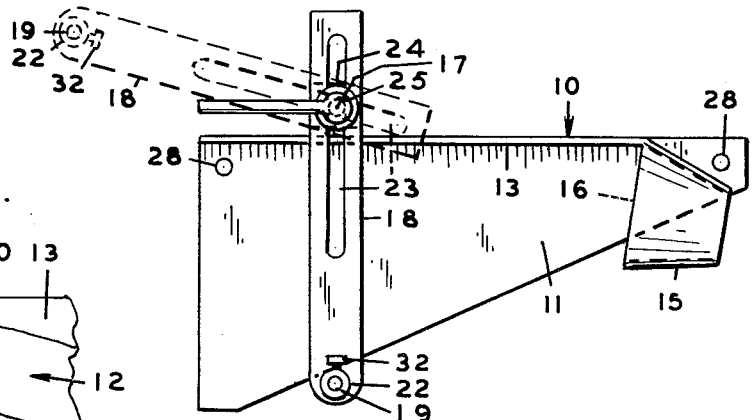
FIGURE 1.
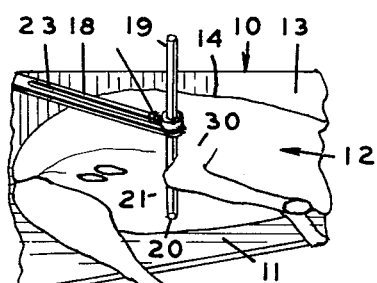
FIGURE 2.
FIGURE 3.
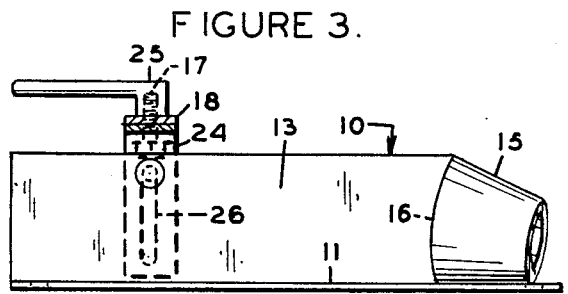
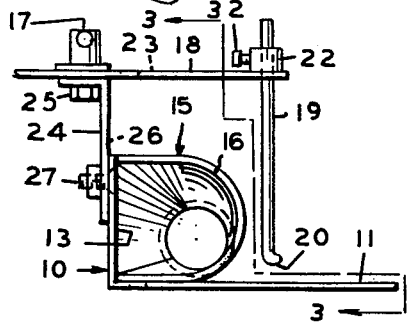
FIGURE 4.
FIGURE 5.
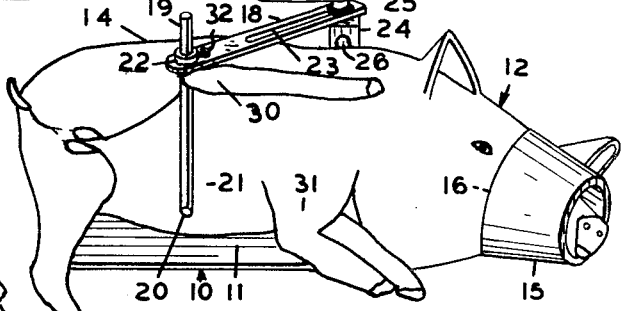
FIGURE 6.
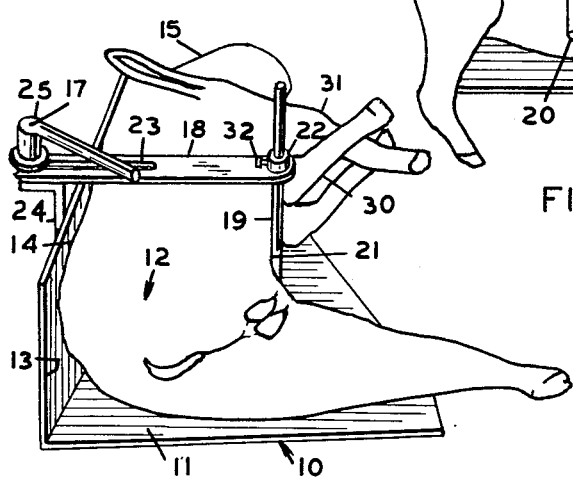
INVENTOR
DAVID L. BRADSHAW
BY *Marvin B. Davis*
ATTORNEY.

ved Jan. 5, 1965

3,164,131
DEVICE FOR FAVORABLY POSITIONING AN
ANIMAL FOR CASTRATION
David L. Bradshaw, Brice Rte., Box 115, Lebanon, Mo.
Filed Sept. 23, 1963, Ser. No. 310,713
1 Claim. (Cl. 119—103)

This invention relates to a device for positioning an animal, especially a pig, in a favorable position for castration.

Heretofore, devices have meen made to hold an inverted pig with straps or rods attached to each device to fasten the pig. Access to the pig for castration on such a device was very difficult for the reason that the rear legs of the pig were held too close together laterally and longitudinally relative to the pig. Such devices and especially the inverted postions of the pigs cause the testicles to retract toward the body of the pig and access thereto is difficult for a castrator.

This improved device has a supporting surface adapted for the support of a pig or animal resting on its side, an upwardly extended surface from one edge of the supporting surface, a muzzle for the reception of a snout of the pig or animal, a jig on the device, and an upright rod adapted to be manually controlled by the jig for bearing against the belly of the pig or animal to thrust the back of the pig or animal against the upwardly extended surface, and thrust the upward rear leg of the pig or animal forwardly toward and close to the upward foreleg thereof.

The advantage of this device as described in the preceding paragraph is to cause the testicles of the animal or pig to fully protrude from the body of the pig or animal with the rear legs spread sufficiently for access to the castration of the mentioned testicles.

In the accompanying drawing:

FIGURE 1 is an illustrated view in perspective of the device with a small animal or pig shown held thereon in a favorable position for a castrator. Both end portions of the device and the head of the animal or pig are broken away. The essential features illustrated are the position of the upper rear leg held forwardly by the upright rod and arm of the jig, in relation to the position of the testicles favorably positioned for castration.

FIGURE 2 is an illustrated view of a plan of the device. The jig arm and rod are shown in a transverse position. Dash lines show the jig arm and rod turned to a release position between applications.

FIGURE 3 is an illustrated view in longitudinal elevation of FIGURE 2 with a part of the jig arm and rod broken away on lines 3—3 of FIGURE 4.

FIGURE 4 is a view illustrating the rear end elevation of the device. A part of the jig arm is broken away.

FIGURE 5 is an illustrated view in rear end perspective of a medium size pig clamped in the device.

FIGURE 6 is an illustrated view of a longitudinal perspective of a large pig clamped in the device. The position of the jig arm is necessarily turned with the upward rod positioned against the upper rear leg and further toward the rear of the device than the pivot of the jig arm for a large pig. The lower rear leg is shown in a relaxed position and the testicles are forced in a fully protruded position for the castrator and are free from interference and obstruction.

The device 10, illustrated in the accompanying drawing, has a supporting surface 11 adapted to support an animal 12, especially a pig, on its side.

An upwardly extended surface 13 from one side of the supporting surface 11 is adapted to receive the thrust of the back 14 of an animal.

A muzzle 15 is secured on the device 10 and has the opening 16 thereof facing toward the end portions of the supporting surface 11 and the upwardly extended surface 13.

A pivot 17 is located above the upper level of the upwardly extended surface 13, and spaced from the muzzle 15, to pivot a jig arm 18 to sweep over the supporting surface 11 in a horizontal spaced relation thereto.

The jig arm 18 has an upright rod 19 mounted in the outward free end portion thereof. The upright rod 19 extends downwardly with the lower end 20 thereof spaced from the supporting surface 11 sufficiently to prevent a pinching of the belly 21 of the animal 12. The lower end 20 of the upright rod is preferably curved and blunted to prevent injury to the belly 21 of the animal 12.

Obvious means of adjustments of the jig arm 18 and upright rod 19 are shown to accommodate a small to large animal relative to the size of pigs. The upright rod 19 is slidably mounted in a boss 22 and selectively held against movement with set screw 32. The jig arm 18 is provided with a longitudinal slot 23 pivoted on an adjustable bracket 24 which is selectively held against movement by clamp bolt 25. The bracket 24 is slotted at 26 for vertical adjustment and is selectively held against movement by a bolt 27. Holes 28 are shown for anchorage of the device 10 if desired.

Operation of the device 10: The device 10 is preferably anchored to a base or table not illustrated.

The animals are preferably grouped in small, medium, and large sizes for castration.

An animal especially a pig 12 is placed with the snout 29 in the muzzle 15 and the body resting in a natural position on its side on the supporting surface 11. The back of the animal 14 is placed against the upwardly extended surface 13.

The operator not illustrated usually stands behind the upwardly extended surface 13 to operate the jig arm 18 and clamp bolt 25.

The jig arm 18 is adjusted for height of the selected size animals by bracket 24 and bolt 27 to pass over the animal. The upright rod 19 is adjusted to compress the belly of the animal 21 with the back of the animal 14 thrust against the upwardly extended surface 13.

The upright rod 19 is adjusted by set screw 32 to position the lower end 20 thereof preferably one-half inch from the support-surface 11 to prevent pinching the belly of the animal.

The operator swings the jig arm 18 and rod 19 to thrust the upright rod 19 against the belly of the animal and also thrust the upper rear leg 30 of the animal forwardly and close to the upper foreleg 31. The animal is then confined in a preferable position with the testicles protruded from the body for the castrator.

I claim:

A device which is designed to support an animal on its side, the snout of the animal being confined in a muzzle, a jig manually operated to compress the belly of the animal toward one side of the device with the back of the animal thrust against the mentioned one side of the device, the jig manually operated to thrust the upper rear leg of the animal forwardly and closely toward the upper forward leg of the animal to spread the rear legs of the animal and force the testicles of the animal in a protruded position relative to the belly of the animal for the access of a castrator; the device comprising:

(a) a supporting surface on said device adapted for supporting an animal, (b) an upwardly extended surface on said device located to one side of said supporting surface and adapted to receive the thrust of a back of an animal, (c) a muzzle, (d) said muzzle being secured to one end of said device and having an opening facing toward and extended above the mentioned supporting surface adapted to receive a snout of an animal, (e) a pivot, (f) said pivot being on said device and located on a level spaced above said upwardly extended surface, (g) said pivot being spaced from said muzzle, (h) an arm, (i) said arm being pivoted on said pivot to sweep horizontally over said supporting surface in spaced relation thereto, (j) a rod, (k) said rod being secured uprightly to said arm, (l) said rod being extendable downwardly toward said supporting surface and adapted to compress the belly of an animal toward said upwardly extended surface and press the upper rear leg of the animal forwardly and close to the upper forward leg, (m) means for fixing a selected position of said arm on said pivot, (n) and said means releasably securing the mentioned fixed position of said arm on said pivot.

References Cited by the Examiner
UNITED STATES PATENTS

| | | | |
|---|---|---|---|
| 1,717,531 | 6/29 | Trees | 119—103 |
| 1,717,532 | 6/29 | Trees | 119—103 |
| 1,746,115 | 2/30 | Hermanni | 119—103 |
| 2,184,364 | 12/39 | Shook | 119—103 |
| 2,663,283 | 12/53 | Julius | 119—103 |

RICHARD A. GAUDET, *Primary Examiner.*